(12) United States Patent
Chen et al.

(10) Patent No.: US 9,521,434 B2
(45) Date of Patent: Dec. 13, 2016

(54) INTERNAL BIT DEPTH INCREASE IN VIDEO CODING

(75) Inventors: Ying Chen, San Diego, CA (US); Peisong Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1225 days.

(21) Appl. No.: 13/491,227

(22) Filed: Jun. 7, 2012

(65) Prior Publication Data

US 2012/0314026 A1    Dec. 13, 2012

Related U.S. Application Data

(60) Provisional application No. 61/495,333, filed on Jun. 9, 2011, provisional application No. 61/552,876, filed on
(Continued)

(51) Int. Cl.
*H04N 15/00* (2006.01)
*H04N 13/00* (2006.01)
(Continued)

(52) U.S. Cl.
CPC ............ *H04N 19/98* (2014.11); *H04N 19/124* (2014.11); *H04N 19/159* (2014.11); *H04N 19/164* (2014.11); *H04N 19/172* (2014.11); *H04N 19/174* (2014.11); *H04N 19/176* (2014.11); *H04N 19/30* (2014.11); *H04N 19/40* (2014.11);
(Continued)

(58) Field of Classification Search
CPC .................... H04N 13/0055; H04N 19/00769; H04N 13/0239
See application file for complete search history.

(56) References Cited

U.S. PATENT DOCUMENTS 6,097,843 A    8/2000  Takashima et al.
6,470,051 B1   10/2002 Campisano et al.
(Continued)

FOREIGN PATENT DOCUMENTS

EP    2222087 A1    8/2010
JP    H10271516 A   10/1998
(Continued)

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.
(Continued)

*Primary Examiner* — Chikaodili E Anyikire
(74) *Attorney, Agent, or Firm* — Shumaker & Sieffert, P.A.

(57) ABSTRACT

In an example aspects of this disclosure generally relate to a method of coding video data that includes determining a first bit depth for outputting video data and a second bit depth for coding the video data, wherein the first bit depth is less than the second bit depth. The method also includes determining whether the video data will be used as reference data when coding other video data. The method also includes storing, based on the determination, the video data at the first bit depth when the video data is not used as reference data, and the video data at the second bit depth when the video data is used as reference data.

41 Claims, 5 Drawing Sheets

Related U.S. Application Data on Oct. 28, 2011, provisional application No. 61/556,002, filed on Nov. 4, 2011.

(51) Int. Cl.

| | |
|---|---|
| *H04N 19/98* | (2014.01) |
| *H04N 19/159* | (2014.01) |
| *H04N 19/176* | (2014.01) |
| *H04N 19/70* | (2014.01) |
| *H04N 19/172* | (2014.01) |
| *H04N 19/30* | (2014.01) |
| *H04N 19/61* | (2014.01) |
| *H04N 19/124* | (2014.01) |
| *H04N 19/164* | (2014.01) |
| *H04N 19/174* | (2014.01) |
| *H04N 19/426* | (2014.01) |
| *H04N 19/40* | (2014.01) |

(52) U.S. Cl.
CPC ............ *H04N 19/428* (2014.11); *H04N 19/61* (2014.11); *H04N 19/70* (2014.11)

(56) References Cited

U.S. PATENT DOCUMENTS

| | | | |
|---|---|---|---|
| 2004/0218680 | A1 | 11/2004 | Rodriguez et al. |
| 2006/0164268 | A1* | 7/2006 | Lee ................. H04N 19/176 341/61 |
| 2007/0230572 | A1* | 10/2007 | Koto ................. H04N 19/105 375/240.12 |
| 2007/0285417 | A1* | 12/2007 | Prokopenko .......... G06T 15/405 345/419 |
| 2008/0075166 | A1 | 3/2008 | Gish et al. |
| 2009/0087111 | A1* | 4/2009 | Noda .............. H04N 21/23892 382/238 |
| 2009/0110054 | A1 | 4/2009 | Kim et al. |
| 2011/0090959 | A1 | 4/2011 | Wiegand et al. |
| 2011/0096839 | A1* | 4/2011 | Gomila ............... H04N 19/102 375/240.16 |
| 2011/0243219 | A1* | 10/2011 | Hong .................. H04N 19/176 375/240.02 |

FOREIGN PATENT DOCUMENTS

| | | |
|---|---|---|
| KR | 20100111841 A | 10/2010 |
| WO | 2007114368 A1 | 10/2007 |

OTHER PUBLICATIONS

Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chen et al., "AHG8: Bit depth of output pictures", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G328, Nov. 9, 2011, XP030110312, 2 pp.
Chono et al., "Rounding-error conscious memory compression method for IBDI", JCT-VC Meeting; MPEG Meeting; Jan. 20, 2011-Jan. 28, 2011; Daegu; (Joint Collaborative Team on Video Coding of ISO/IEC JTC1/SC29/WG11AND ITU-T SG.16); URL: http://wftp3.itu.int/av-arch/jctvc-site/, No. JCTVC-D045, Jan. 15, 2011, XP030008086, ISSN: 0000-0015, 6 pp.
Chujoh et al., "Internal bit depth increase except frame memory", VCEG Meeting; MPEG Meeting; Apr. 23, 2007-Apr. 27, 2007; San Jose; (Video Coding Experts Group of ITU-T SG.16), No. VCEG-AF07, XP030003528, ISSN: 0000-0068, 4 pp.
Chujoh "Tool Experiment 2: Internal bit-depth increase (IBDI) and memory compression", JCT-VC Meeting; Apr. 15, 2010-Apr. 23, 2010; Dresden; (Joint Collaborative Team on Video Coding of ISO/IEC JTC1/SC29/WG11 and ITU-TSG.16); URL: http://wftp3.itu.int/av-arch/jctvc-site/, No. JCTVC-A302, XP030007588, 5 pp.
Hoang "Unified scaling for 10-bit to 8-bit reference frame compression", MPEG Meeting; Mar. 21, 2011-Mar. 25, 2011; Geneva; (Motion Picture Expert Group or ISO/IEC JTC1/SC29/WG11), No. m19978, XP030048545, 13 pp.
International Preliminary Report on Patentability—PCT/US2012/041575, The International Bureau of WIPO—Geneva, Switzerland, Sep. 16, 2013, 10 pp.
International Search Report and Written Opinion—PCT/US2012/041575—ISA/EPO—Jul. 19, 2012, 17 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Stockhammer et al., "DASH: Updates to Media Segments for ISO base media file format", MPEG Meeting; Jan. 24, 2011-Jan. 28, 2011; Daegu; (Motion Picture Expert Group or ISO/IEC JTC1/SC29/WG11), No. m19478, XP030048045, 5 pp.
Wiegand, et al., "High Efficiency Video Coding (HEVC) text specification Working Draft 1", JCT-VC Meeting; MPEG Meeting; Oct. 7, 2010-Oct. 15, 2010; Guangzhou; (Joint Collaborative Team on Video Coding of ISO/IECJTC1/SC29/WG11 and ITU-T SG.16); URL: http://wftp3.itu.int/av-arch/jctvc-site/, No. JCTVC-C403, XP030008032, ISSN: 0000-0018, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Second Written Opinion from International Application No. PCT/2012/041575, dated May 16, 2013, 6 pp.
Response to Second Written Opinion dated May 16, 2013, from International Application No. PCT/US2012/041575, filed Jul. 15, 2013, 20 pp.
Response to Informal Communication dated Aug. 22, 2013, from International Application No. PCT/US2012/041575, filed Sep. 6, 2013, 18 pp.
Notification Concerning Informal Communications with the Applicant from International Application No. PCT/US2012/041575, dated Aug. 27, 2013, 3 pp.
Hoang, "Unified scaling with adaptive offset for reference frame compression with IBDI," Joint Collaborative Team on Video Coding (JCT-VC) of ITU-T SG16 WP3 and ISO/IEC JTC1/SC29/WG11, Document: JCTVC-D035_r2, Jan. 20-28, 2011, 12 pp.
Naito et al.,"Recent Trend of Transmission Technology for Super High Resolution," ITE Technical Report, The Institute of Image and Television Engineers, vol. 31, No. 63, Dec. 13, 2007, pp. 89-94.

(56) References Cited

OTHER PUBLICATIONS

Okubo, "Impress Standard Textbook Series—3rd Revision of H.264/AVC Textbook," 1st Edition, Impress R&D, ISBN: 978-4-8443-2664-9, Jan. 1, 2009, pp. 169-180.
First Office Action from counterpart Japanese Patent Application No. 2014-514885, dated Dec. 9, 2014, 19 pp.
Information Technology-Generic Coding of Moving Pictures and Associated Audio: Systems, Recommendation H.222.0; International Organization for Standardization, ISO/IEC JTC1/SC29/WG11; Coding of Moving Pictures and Associated Audio May 2006.
Notice of Grounds for Rejection from counterpart Korean Application No. 2014-7000562, dated May 21, 2015, 8 pp.
Korean Notice of Final Rejection from Application Serial No. 2014-7000562 dated Apr. 8, 2016 including translation (6 pages).
Notice of Final Rejection, and translation thereof, from counterpar Korean Application No. 2014-7000562, dated Dec. 22, 2015, 6 pp.

\* cited by examiner

INTERNAL BIT DEPTH INCREASE IN VIDEO CODING

This application claims the benefit of U.S. Provisional Patent Application No. 61/495,333 filed 9 Jun. 2011, U.S. Provisional Patent Application No. 61/552,876 filed 28 Oct. 2011, and U.S. Provisional Patent Application No. 61/556,002 filed 4 Nov. 2011, the contents of all of which are hereby incorporated by reference in their entirety.

TECHNICAL FIELD

This disclosure relates to video coding techniques.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, the techniques of this disclosure relate to video coding and internal bit depth increase (IBDI) in video coding. For example, a video coder may use IBDI to increase the bit depth of a sample being coded to reduce rounding errors in internal calculations. The techniques of this disclosure generally relate to managing memory utilization when using IBDI, as well as determining an output bit depth. That is, for example, the techniques of this disclosure include, in some examples, rounding video data from a higher bit depth to a lower bit depth prior to storing the video data to a decoded picture buffer if the video data is not used as reference video data. In another example, the techniques of this disclosure relate to determining whether to output video data in an IBDI (e.g., increased) bit depth.

In an example aspects of this disclosure generally relate to a method of coding video data that includes determining a first bit depth for outputting video data and a second bit depth for coding the video data, wherein the first bit depth is less than the second bit depth. The method also includes determining whether the video data will be used as reference data when coding other video data. The method also includes storing, based on the determination, the video data at the first bit depth when the video data is not used as reference data, and the video data at the second bit depth when the video data is used as reference data.

In another example, aspects of this disclosure generally relate to an apparatus for coding video data that includes one or more processors configured to determine a first bit depth for outputting video data and a second bit depth for coding the video data, wherein the first bit depth is less than the second bit depth; determine whether the video data will be used as reference data when coding other video data; and store, based on the determination, the video data at the first bit depth when the video data is not used as reference data, and the video data at the second bit depth when the video data is used as reference data.

In another example, aspects of this disclosure generally relate to an apparatus for coding video data that includes means for determining a first bit depth for outputting video data and a second bit depth for coding the video data, wherein the first bit depth is less than the second bit depth; means for determining whether the video data will be used as reference data when coding other video data; and means for storing, based on the determination, the video data at the first bit depth when the video data is not used as reference data, and the video data at the second bit depth when the video data is used as reference data.

In another example, aspects of this disclosure generally relate to a computer-readable storage medium having instructions stored thereon that, when executed, cause one or more processors to determine a first bit depth for outputting video data and a second bit depth for coding the video data, wherein the first bit depth is less than the second bit depth; determine whether the video data will be used as reference data when coding other video data; and store, based on the determination, the video data at the first bit depth when the video data is not used as reference data, and the video data at the second bit depth when the video data is used as reference data.

The details of one or more aspects of the disclosure are set forth in the accompanying drawings and the description below. Other features, objects, and advantages of the tech-

DETAILED DESCRIPTION

Figure 1:
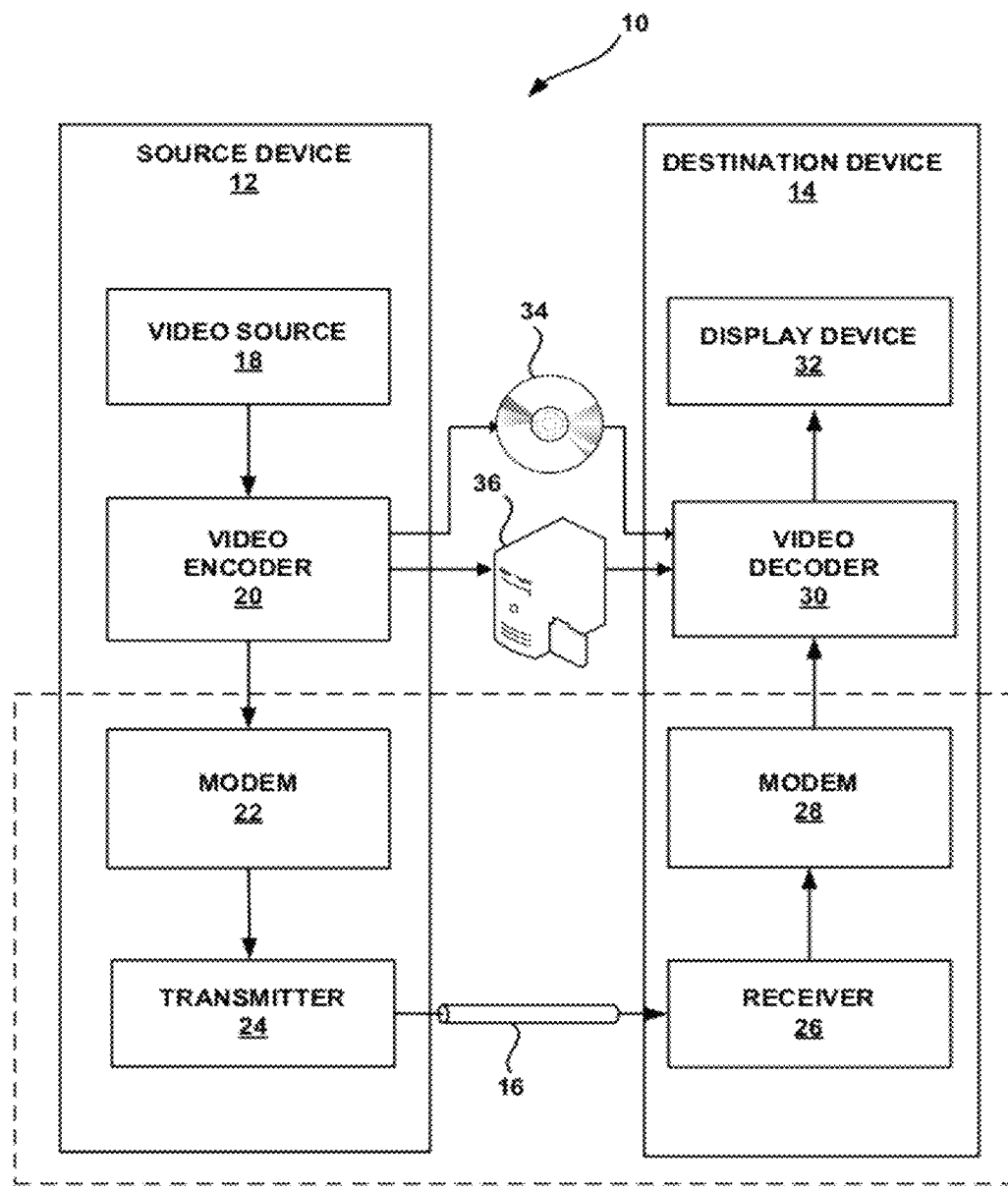
FIG. 1 is a block diagram illustrating an example video encoding and decoding system that may utilize the techniques of this disclosure.

In general, the techniques of this disclosure relate to video coding. For example, a video coder may use an internal bit depth increase (IBDI) operation to increase the bit depth of a sample being coded to reduce rounding errors in internal calculations. The techniques of this disclosure generally relate to managing memory utilization when using IBDI, as well as determining an output bit depth. That is, for example, the techniques of this disclosure include, in some examples, rounding video data from a higher bit depth to a lower bit depth prior to storing the video data to a decoded picture buffer if the video data is not used as reference video data. In another example, the techniques of this disclosure relate to determining whether to output video data in an increased bit depth.

For example, bit depth may generally refer to a number of bits of information for a given sample (e.g., luma and/or chroma values for a pixel) of video data. When performing IBDI, a video coder may expand the bit depth of a sample being coded from a first number of bits (e.g., "M" bits) to a second, increased number of bits (e.g., "N" bits). The greater bit depth is intended to reduce rounding errors in internal calculations. For example, increasing arithmetic precision when performing internal calculations may help to achieve ideal results. Example processes that may benefit from increased bit depth may include motion compensation, interpolation filtering, de-blocking filtering, and weighted prediction, among others.

A video coder may store decoded video data to a decoded picture buffer during coding (e.g., for use as reference data for predictive coding). The video coder may also store the decoded video data to the decoded picture buffer prior to output (e.g., display). When performing internal calculations at an increased bit depth (e.g., using IBDI), a video coder may store video data at the increased bit depth. Accordingly, the video coder may perform rounding prior to outputting the video data from the decoded picture buffer for display.

Storing video data at the increased bit depth may consume a relatively large amount of memory. Some of the video data (e.g., video pictures) stored in the decoded picture buffer, however, may not be used as reference data (e.g., reference pictures). That is, certain pictures of video data may not be used as reference data, but may still be stored in the decoded picture buffer prior to being output (e.g., for display). Moreover, some video pictures stored to the decoded picture buffer may be marked by the video coder as "unused for reference" during the coding process. While this disclosure generally refers to "pictures," "video pictures," and "reference pictures," it should be understood that the techniques of this disclosure are applicable to video data of other sizes/configurations of video data (e.g., video blocks, slices, tiles, and the like).

Aspects of this disclosure generally relate to managing memory utilization when using an internal bit depth in a video coder that may be higher than the bit depth used for display. For example, the techniques of this disclosure include storing video data at a first, increased bit depth when the video data will be used as reference data, and storing video data at a decreased bit depth when the decoded video pictures will not be used as reference pictures. That is, the techniques of this disclosure generally relate to rounding video data from an increased bit depth to a lower bit depth prior to storing the video data to a decoded picture buffer when the video data is not used as reference video data. For example, the techniques of this disclosure include converting a decoded video picture with an increased bit depth to a decoded video picture with a lower bit depth, relative to the increased bit depth.

In general, the lower bit depth may be equal to the original bit depth at which the video data was received. However, the lower bit depth may also be equal to the bit depth at which the video data is output (e.g., in examples in which the output bit depth is less than the increased bit depth) or some other lower bit depth than the increased bit depth. In addition, while aspects of this disclosure are described with respect to rounding video data to lower the bit depth, it should be understood that the techniques of this disclosure are more generally applicable reducing the bit depth of samples of video data, whether by rounding, truncation (without rounding), or some other process or decreasing the bit depth.

Aspects of this disclosure also relate to determining whether to output video data in an increased bit depth or a decreased bit depth (e.g., the original bit depth). In some examples, such a determination may be made according to signaling associated with a bit depth at which video data is to be output (e.g., output by a video decoder). Such signaling may be included, for example, in an encoded video data bitstream that may be decoded by a video decoder. That is, the techniques of this disclosure include signaling to a video decoder whether the video decoder should output video data at the decreased bit depth, e.g., equal to the bit depth at which the video data was received (referred to as the "original" bit depth), or output the video data at an increased bit depth (e.g., an IBDI bit depth). In another example, the output bit depth is not present as part of the decoded video bitstream but derived from a source that is external to the video decoder, such as by a configuration of a display that is presenting decoded video data from the video decoder.

A video coder may, in some examples, implement the memory management techniques of this disclosure with the techniques directed to determining an output bit depth. In examples in which the video coder is to output video data in the original (lower) bit depth, the video coder may implement the memory management techniques described above so that a decoded pictures is only stored in the increased (IBDI) bit depth when the decoded picture is to be used as reference picture.

Aspects of this disclosure may reduce memory requirements associated with encoding and/or decoding video data. For example, in examples in which an IBDI technique is used to increase the bit depth of video data for internal coding operations but the video data is not used for reference, the techniques of this disclosure allow fewer bits of data to be stored. In addition, the techniques may reduce memory bandwidth consumption. For example, multiple modules may share a memory bus to access memory during coding. In such examples, storing fewer bits to the buffer, in accordance with the techniques of this disclosure, may decrease the amount of data that is transferred between the buffer and the video coding device.

In some examples, reducing the memory bandwidth may be useful in mobile applications (e.g., in applications in which a video coder is incorporated in a mobile device). For example, as noted above, reads and writes to memory may consume memory bus bandwidth, which may be relatively limited in mobile applications. Moreover, reads and writes to memory may increase the amount of power that is consumed by a mobile device (e.g., considering that the reads and writes each require powering the memory bus and memory). Accordingly, the techniques of this disclosure may be deployed in power-limited devices, such as mobile devices, laptop computers and any other type of device that does not have a constant dedicated supply of power.

FIG. 1 is a block diagram illustrating an example video encoding and decoding system 10 that may be configured to utilize the techniques described in this disclosure for managing memory utilization when using IBDI in a video coder. As shown in the example of FIG. 1, system 10 includes a source device 12 that generates encoded video for decoding by destination device 14. Source device 12 may transmit the encoded video to destination device 14 via communication channel 16 or may store the encoded video on a storage medium 34 or a file server 36, such that the encoded video may be accessed by the destination device 14 as desired. Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like.

In many cases, such devices may be equipped for wireless communication. Hence, communication channel 16 may comprise a wireless channel, a wired channel, or a combination of wireless and wired channels suitable for transmission of encoded video data. For example, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

The techniques described in this disclosure for managing memory utilization when using IBDI in a video coder, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

As further shown in the example of FIG. 1, source device 12 includes a video source 18, video encoder 20, a modulator/demodulator (modem) 22 and a transmitter 24. In source device 12, video source 18 may include a source such as a video capture device. The video capture device, by way of example, may include one or more of a video camera, a video archive containing previously captured video, a video feed interface to receive video from a video content provider, and/or a computer graphics system for generating computer graphics data as the source video. As one example, if video source 18 is a video camera, source device 12 and destination device 14 may form so-called camera phones or video phones. The techniques of this disclosure, however, are not necessarily limited to wireless applications or settings, and may be applied to non-wireless devices including video encoding and/or decoding capabilities. Source device 12 and destination device 14 are merely examples of coding devices that can support the techniques described herein.

The captured, pre-captured, or computer-generated video may be encoded by video encoder 20. The encoded video information may be modulated by modem 22 according to a communication standard, such as a wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by destination device 14 for decoding and playback.

File server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The file server 36 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the file server 36 may be a streaming transmission, a download transmission, or a combination of both.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data, such as an output bit depth, by storing certain syntax elements to headers of various encoded portions of video data. In some cases, such syntax elements may be encoded and stored (e.g., stored to storage medium 34 or file server 36) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Destination device 14, in the example of FIG. 1, includes a receiver 26, a modem 28, a video decoder 30, and a display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on a storage medium 34 or a file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard currently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

The HEVC standard refers to a block of video data as a coding unit (CU). In general, a CU has a similar purpose to a macroblock coded according to H.264, except that a CU does not have a size distinction. Thus, a CU may be split into sub-CUs. In general, references in this disclosure to a CU may refer to a largest coding unit (LCU) of a picture or a sub-CU of an LCU. For example, syntax data within a bitstream may define the LCU, which is a largest coding unit in terms of the number of pixels. An LCU may be split into sub-CUs, and each sub-CU may be split into sub-CUs. Syntax data for a bitstream may define a maximum number of times an LCU may be split, referred to as a maximum CU depth. Accordingly, a bitstream may also define a smallest coding unit (SCU).

An LCU may be associated with a hierarchical quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference picture to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, a video encoder may calculate a residual value for the portion of the CU corresponding to the PU. The residual value may be transformed, quantized, and scanned. A TU is not necessarily limited to the size of a PU. Thus, TUs may be larger or smaller than corresponding PUs for the same CU. In some examples, the maximum size of a TU may be the size of the corresponding CU. This disclosure also uses the term "block" to refer to any of a CU, PU, or TU.

In general, encoded video data may include prediction data and residual data. Video encoder 20 may produce the prediction data during an intra-prediction mode or an inter-prediction mode. Intra-prediction generally involves predicting the pixel values in a block of a picture relative to reference samples in neighboring, previously coded blocks of the same picture (which may also be referred to as a frame). Inter-prediction generally involves predicting the pixel values, e.g., luma and chroma values, in a block of a picture relative to data of a previously coded picture.

Following intra- or inter-prediction, video encoder 20 may calculate residual pixel values for the block. The residual values generally correspond to differences between the predicted pixel value data for the block and the true pixel value data of the block. For example, the residual values may include pixel difference values indicating differences between coded pixels and predictive pixels. In some examples, the coded pixels may be associated with a block of pixels to be coded, and the predictive pixels may be associated with one or more blocks of pixels used to predict the coded block.

To further compress the residual values of a block, the residual values may be transformed into a set of transform coefficients that compact as much data (also referred to as "energy") as possible into as few coefficients as possible. Transform techniques may comprise a discrete cosine transform (DCT) process or conceptually similar process, integer transforms, wavelet transforms, or other types of transforms. The transform converts the residual values of the pixels from the spatial domain to a transform domain. The transform coefficients correspond to a two-dimensional matrix of coefficients that is ordinarily the same size as the original block. In other words, there are just as many transform coefficients as pixels in the original block of residual data. However, due to the transform, many of the transform coefficients may have values equal to zero.

Video encoder 20 may then quantize the levels of the transform coefficients to further compress the video data. Quantization generally involves mapping values within a relatively large range to values in a relatively small range, thus reducing the amount of data needed to represent the quantized transform coefficients. More specifically, quantization may be applied according to a quantization parameter (QP), which may be indexed to a quantizer step size that is applied to a transform coefficient during quantization. Video encoder 20 may modify the degree of quantization (e.g., the quantizer step size) by adjusting the QP.

Following quantization, video encoder 20 may scan the transform coefficients, producing a one-dimensional vector from the two-dimensional matrix including the quantized transform coefficients. Video encoder 20 may then entropy encode the resulting array to even further compress the data. In general, entropy coding comprises one or more processes that collectively compress a sequence of quantized transform coefficients and/or other syntax information. For example, syntax elements, such as delta QPs, prediction vectors, coding modes, filters, offsets, or other information, may also be included in the entropy coded bitstream. The scanned coefficients are then entropy coded along with any syntax information, e.g., via content adaptive variable length coding (CAVLC), context adaptive binary arithmetic coding (CABAC), or another entropy coding process.

To perform CABAC, video encoder 20 may select a context model to apply to a certain context to encode symbols to be transmitted. The context may relate to, for example, whether neighboring values are non-zero or not. Video encoder 20 may also entropy encode syntax elements, such as a significant coefficient flag and a last coefficient flag produced when performing an adaptive scan.

The video decoding process performed by video decoder 30 may generally include reciprocal techniques to the encoding techniques performed by video encoder 20. Although generally reciprocal, video decoder 30 may, in some instances, perform techniques similar to those performed by video encoder 20. In other words, video decoder 30 may perform substantially similar processes to those performed by video encoder 20. Video decoder 30 may also rely on syntax elements or other data contained in a received bitstream that includes the data described with respect to video encoder 20.

In some examples, video encoder 20 may generate and video decoder 30 may receive certain parameter sets, which may be used when decoding video data. For example, in the H.264/AVC (Advanced Video Coding) standard, coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC.

In addition, video decoder 30 may, in some examples, conform to a standard that implements a certain media format. For example, an ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. The base format may be used as the basis for other file formats in the family, such as the Advanced Video Coding (AVC) file format (ISO/IEC 14496-15) defined to support H.264/MPEG-4 AVC video compression, the 3GPP file format, the SVC file format, and the MVC file format, which are extensions of the AVC file format.

In general, the ISO base media file format contains the timing, structure, and media information for timed sequences of media data, such as audio-visual presentations. The file structure may be object-oriented. That is, a file may be decomposed into basic objects very simply and the structure of the objects may be implied from their type. Files conforming to the ISO base media file format may be formed as a series of objects, called "boxes." Data is generally contained in boxes and there is typically no other data within the file. Thus, the "box" is an object-oriented building block defined by a unique type identifier and length.

In another example, the AVC file format, also known as MPEG-4 part-15, is an extension of ISO base media file format. In the AVC file format, a video sample is contained in the "AVCSample", which contains AVCDecoderConfigurationRecord, as well as the NAL unit of the same access unit. The AVCDecoderConfigurationRecord can also be contained in "AVCParameterSample," which contains only parameter sets. The syntax of the AVCDecoderConfigurationRecord may include the following:

```
aligned(8) class AVCDecoderConfigurationRecord {
    unsigned int(8) configurationVersion = 1;
    unsigned int(8) AVCProfileIndication;
    unsigned int(8) profile_compatibility;
    unsigned int(8) AVCLevelIndication;
    bit(6) reserved = '111111'b;
    unsigned int(2) lengthSizeMinusOne;
    bit(3) reserved = '111'b;
```

```
    unsigned int(5) numOfSequenceParameterSets;
    for (i=0; i< numOfSequenceParameterSets; i++) {
        unsigned int(16) sequenceParameterSetLength ;
        bit(8*sequenceParameterSetLength)
sequenceParameterSetNALUnit;
    }
    unsigned int(8) numOfPictureParameterSets;
    for (i=0; i< numOfPictureParameterSets; i++) {
        unsigned int(16) pictureParameterSetLength;
        bit(8*pictureParameterSetLength)
pictureParameterSetNALUnit;
    }
}
```

In the example above, the AVCDecoderConfigurationRecord contains certain profile and level related elements. As with many video coding standards, H.264/AVC defines the syntax, semantics, and decoding process for error-free bitstreams, any of which conform to a certain profile or level. H.264/AVC does not specify an encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

The H.264/AVC standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264/AVC standard further recognizes that, in many applications, it is neither practical nor economical to implement a decoder capable of dealing with all hypothetical uses of the syntax within a particular profile. Accordingly, the H.264/AVC standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264/AVC standard further provides that individual implementations may support a different level for each supported profile.

In some examples, video encoder 20 and/or video decoder 30 may also operate according to other proprietary or industry standards such as the MPEG-2 standard. The MPEG-2 Systems specification describes how compressed multimedia data streams (e.g., video and audio streams) may be multiplexed together with other data to form a single data stream suitable for digital transmission or storage. The latest specification of MPEG-2 systems is specified in "Information Technology—Generic Coding of Moving Pictures and Associated Audio: Systems, Recommendation H.222.0; International Organization for Standardization, ISO/IEC JTC1/SC29/WG11; Coding of Moving Pictures and Associated Audio," May 2006.

By way of background, according to MPEG-2, an elementary stream is a single, digitally coded (possibly MPEG-compressed) component of a program. For example, the coded video or audio part of the program can be an elementary stream. An elementary stream may be converted into a packetized elementary stream (PES) before being multiplexed into a program stream or transport stream. Within the same program, a stream_id may be used to distinguish the PES-packets belonging to one elementary stream from the other.

A program stream generally includes one or more associated elementary streams and typically contains packets with variable length packets. In addition, a program stream generally includes PES-packets that are derived from the contributing elementary streams and that are organized into so-called "packs." A pack includes a pack-header, an optional system-header and any number of PES-packets taken from any of the contributing elementary streams, in any order. The system header, when included, may contain a summary of the characteristics of the program stream such as a maximum data rate, the number of contributing video and audio elementary streams, and timing information. A decoder, such as video decoder 30, may use the information contained in a system header to determine whether the decoder is capable of decoding the program stream.

A transport stream is intended for the simultaneous delivery of a number of programs over potentially error-prone channels. A transport stream comprises a succession of relatively short transport packets, which reduces the susceptibility to errors. While a transport stream provides error resilience and an ability to carry many simultaneous programs, it may also include a more sophisticated multiplex than the program stream and may be more difficult to create and to de-multiplex.

A 13-bit Packet Identifier (PID) field may be used to distinguish transport packets containing the data of one elementary stream from those carrying the data of other elementary streams. Program specific information may specify the relationship between programs and the component elementary streams. The basic program map table (PMT) may be embellished with some of the many descriptors specified within the MPEG-2 systems specification. Assume, for purposes of example, that a PMT includes a program with the number three that contains the video with PID 33, English audio with PID 57, and Chinese audio with PID 60. A PMT may include more than one program.

The descriptors associated with a PMT typically convey further information about a program or its component elementary streams. The descriptors include video encoding parameters, audio encoding parameters, language identification, pan-and-scan information, conditional access details, copyright information and so on. A broadcaster or other user may define additional private descriptors if required.

A program stream map (PSM) provides a description of the elementary streams in the program stream and their relationship to one another. When carried in a transport stream, the PSM may not be modified. The PSM is present as a PES packet when the stream_id value is 0xBC. A program association table (PAT) provides a complete list of all the programs available in a transport stream, along with the PID value of the transport packets that contain its program map table (PMT). Using the same example mentioned above, the PMT that specifies the elementary streams of program number three may have a PID of 1001 and another PMT may have another PID of 1002.

For AVC (e.g., ITU-T Rec. H.264|ISO/IEC 14496-10) video streams, the AVC video descriptor provides basic information for identifying coding parameters of the associated AVC video stream, such as on profile and level parameters included in the SPS of an AVC video stream.

For example, the AVC video descriptor may signal the presence of AVC still pictures and the presence of AVC 24-hour pictures in the AVC video stream. If such a descriptor is not included in the PMT or PSM (if present), the AVC video stream may not contain AVC still pictures and AVC 24-hour pictures. An example AVC video descriptor is included in the example Table 1 below:

TABLE 1

AVC Video Descriptor

| Syntax | No. of bits | Mnemonic |
|---|---|---|
| AVC_video_descriptor ( ) { | | |
|     descriptor_tag | 8 | uimsbf |
|     descriptor_length | 8 | uimsbf |
|     profile_idc | 8 | uimsbf |
|     constraint_set0_flag | 1 | bslbf |
|     constraint_set1_flag | 1 | bslbf |
|     constraint_set2_flag | 1 | bslbf |
|     AVC_compatible_flags | 5 | bslbf |
|     level_idc | 8 | uimsbf |
|     AVC_still_present | 1 | bslbf |
|     AVC_24_hour_picture_flag | 1 | bslbf |
|     reserved | 6 | bslbf |
| } | | |

Video encoder 20 and/or video decoder 30 may also conform to an MPEG specified Dynamic Adaptive Streaming based on HTTP (DASH). In DASH, there is a manifest file, namely MPD (Media Presentation Descriptor) which describes the representations of the service. For example, an MPD may include data that generally describes characteristics of included representations, such as coding and rendering characteristics, adaptation sets, a profile to which the MPD corresponds, text type information, camera angle information, rating information, trick mode information (e.g., information indicative of representations that include temporal sub-sequences), and/or information for retrieving remote periods (e.g., for targeted advertisement insertion into media content during playback).

Each representation may include header data and one or more segments of media data. The header data, when present, may describe characteristics of segments, e.g., temporal locations of random access points, byte offsets to random access points within the segments, uniform resource locators (URLs) of the segments, or other aspects of the segments. Additionally or alternatively, such characteristics may be fully included within the MPD. Each segment may include one or more coded video samples, each of which may include pictures or slices of video data. Each of the coded video samples of the segments may have similar characteristics, e.g., height, width, and bandwidth requirements. Each of the segments may be associated with a unique uniform resource identifier (URI), e.g., a uniform resource locator (URL). Thus, each of the segments may be independently retrievable using a streaming network protocol, such as DASH. In this manner, a destination device (which may include a video decoder, such as video decoder 30), may use an HTTP Get request to retrieve the segments.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

According to aspects of this disclosure, as described in greater detail with respect to FIGS. 3 and 4 below, video encoder 20 and/or video decoder 30 may perform memory utilization management when using an internal bit depth that is higher than the output bit depth. That is, the internal bit depth generally refers to a bit depth that is used for calculations that are internal to video encoder 20 and/or video decoder 30. Example internal calculations include motion compensation, interpolation filtering, de-blocking filtering, and weighted prediction, among others The output bit depth generally refers to the bit depth that is transmitted from video encoder 20 and/or video decoder 30. For example, with respect to video decoder 30, the output bit depth is the bit depth of samples (e.g., luma and/or chroma values for a pixel) that are sent to display device 32 for presentation.

For example, video encoder 20 and/or video decoder 30 may store video data at a first, increased bit depth when the decoded pictures will be used as reference pictures. Video encoder 20 and/or video decoder 30 may store decoded pictures at a decreased bit depth (e.g., original bit depth) when the decoded pictures will not be used as reference pictures. That is, video encoder 20 and/or video decoder 30 may round video data from an increased bit depth to a lower bit depth prior to storing the video data to a decoded picture buffer if the decoded picture is not used as a reference picture.

In addition, according to aspects of this disclosure, video encoder 20 may provide, and video decoder 30 may decode certain indications (e.g., such as syntax elements) regarding an output format for video decoder 30. For example, aspects of this disclosure also relate to signaling associated with a bit depth at which video data is to be output by video decoder 30. For example, video encoder 20 may encode, and video decoder 30 may decode, syntax elements indicating whether video decoder 30 should output pictures at an original bit depth at which the video data was received by video encoder 20 or video decoder 30, or output the pictures at an increased bit depth (e.g., an IBDI bit depth).

Such signaling may be provided, for example, in an SPS, PPS, or other parameter set, or in one or more SEI messages. In another example, such signaling may be provided in a file format (e.g., as an extension to an ISO base media file format), or sample that contains profile and level information. In another example, in an MPEG-2 system, such signaling may be provided in a descriptor. In another example, in a Dynamic Adaptive Streaming over HTTP (DASH) environment, such signaling may be provided in a media presentation description (MPD) file. In another example, such signaling may be used by a display device that decides the output bit-depth through, e.g., remote control.

Figure 2:
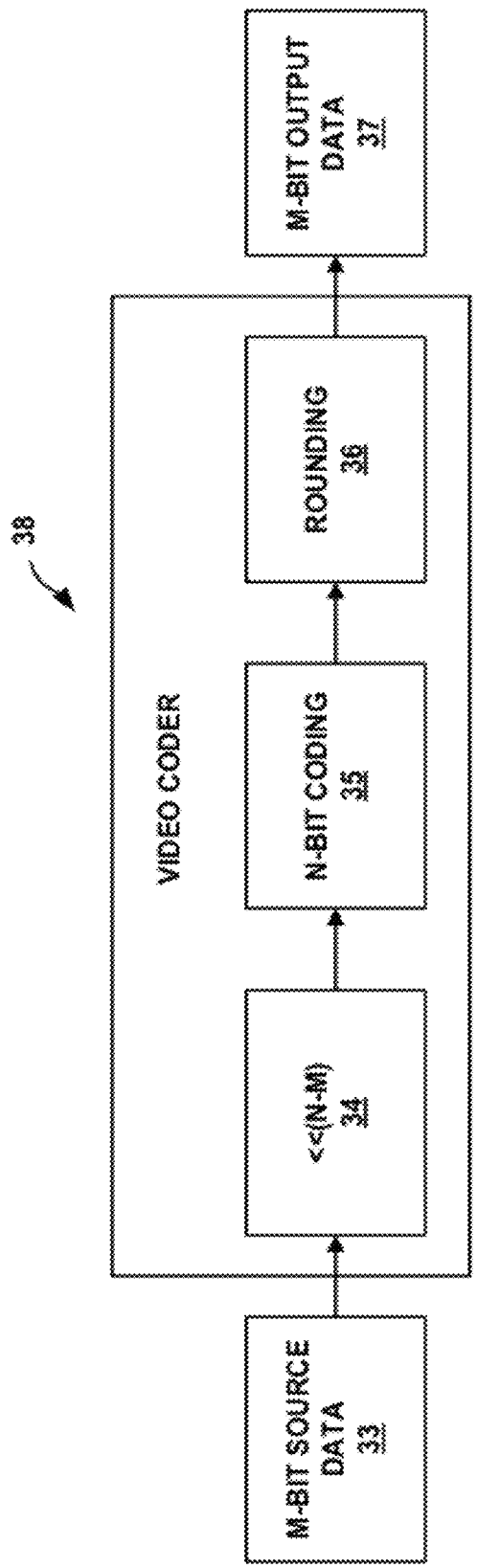
FIG. 2 is a block diagram illustrating example internal bit depth increase (IBDI) operations in video coding.

FIG. 2 is a block diagram illustrating example IBDI operations in video coding. While the operations described with respect to FIG. 2 are generally described as being performed by video coder 38, it should be understood that such operations may be performed by video encoder 20 and/or video decoder 30, as described in greater detail below.

In the example of FIG. 2, video coder 38 receives M-bit source data 33. Source data 33 may include, for example, pictures having samples (e.g., pixel values) of "M" bits in depth, where "M" is a positive value. In an example, source data 33 may include pictures having samples with an eight bit depth, although other bit depths may also be used.

Upon receiving source data 33, video coder 38 may increase the bit depth of source data 33. For example, as shown in the example of FIG. 2, video coder 38 may perform right shift operations (<<) on source data 22 to increase the bit depth of source data 33 by N-M bits, where "N" is greater than "M" (34). In an example in which M is eight bits and N is 10 bits, video coder 38 may perform right shift operations to expand source data 33 by two bits.

After increasing the bit depth of source data 33, video coder 38 may perform N-bit coding operations (35). For example, video coder 38 may perform intra-picture prediction, apply one or more interpolation filters, apply one or more de-blocking filters, apply one or more spatial transforms, or perform other processes using the increased bit depth. Using a relatively higher (increased) bit depth for internal calculations (e.g., internal to video coder 38) may also be referred to as High Accuracy Internal Process (HAIP). By applying HAIP, the accuracy of internal processes is increased by N-M bits. The greater bit depth may help to reduce rounding errors in internal calculations. For example, increasing arithmetic precision when performing internal calculations (e.g., such as digital filter processing) may help to achieve ideal results. In some examples, video coder 38 may be configured to perform some operations using the original M-bit source data 33 and other operations using the N-bit, bit-increased data.

Video coder 38 may then perform rounding operations (truncation) on the resulting data prior to outputting the data. For example, video coder 38 may round the bit-increased data back to the original M-bit depth (36). Accordingly, video coder 38 may output M-bit output data 37. Output data 37 may be an encoded bitstream (e.g., when output data 37 is from a video encoder) or may be decoded pictures (e.g., when output data 37 is from a video decoder).

Figure 3:
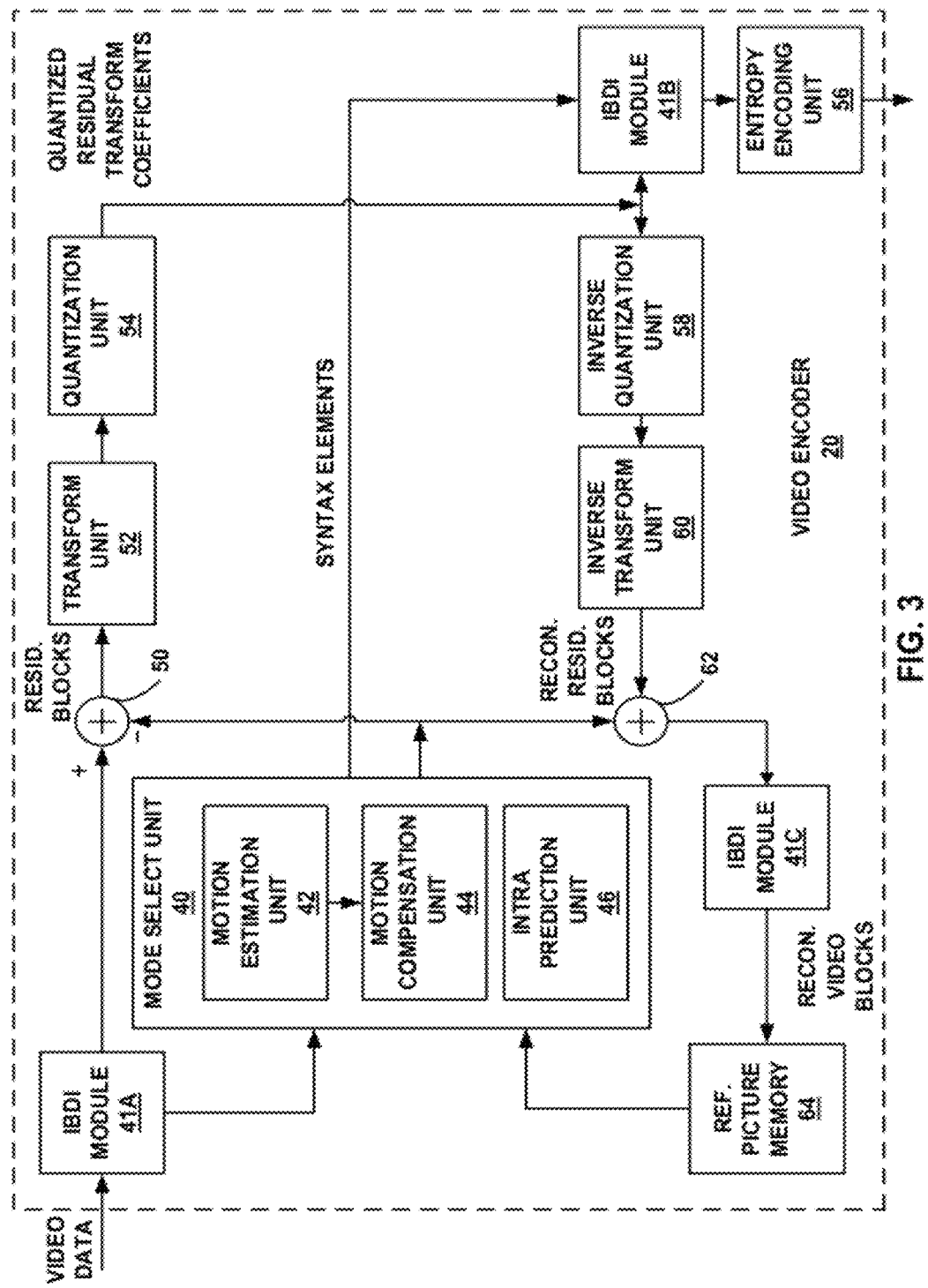
FIG. 3 is a block diagram illustrating an example of a video encoder that may implement any or all of the techniques of this disclosure.

FIG. 3 is a block diagram illustrating an example of video encoder 20 that may implement techniques for managing memory utilization when using IBDI in a video coder. It should be understood that certain components of FIG. 3 may be shown and described with respect to a single component for conceptual purposes, but may include one or more functional units. In addition, while certain components of FIG. 3 may be shown and described with respect to a single component, such components may be physically comprised of one or more than one discrete and/or integrated units.

As shown in FIG. 3, video encoder 20 receives a current video block within a video picture to be encoded. In the example of FIG. 3, video encoder 20 includes mode select unit 40, IBDI module 41A, 41B, and 41C (collectively, IBDI modules 41), motion estimation unit 42, motion compensation unit 44, reference picture memory 64, summer 50, transform unit 52, quantization unit 54, and entropy coding unit 56. For video block reconstruction, video encoder 20 also includes inverse quantization unit 58, inverse transform unit 60, and summer 62. A deblocking filter (not shown in FIG. 3) may also be included to filter block boundaries to remove blockiness artifacts from reconstructed video. If desired, the deblocking filter would typically filter the output of summer 62.

During the encoding process, video encoder 20 receives a video picture or slice to be coded. The picture or slice may be divided into multiple video blocks. In some examples, IBDI module 41A may increase the bit depth of received samples (e.g., pixels) of the received video picture or slice to be coded. For example, as described with respect to FIG. 2 above, IBDI module 41A may perform a right shift operation to increase the bit depth of received samples. In an example for purposes of illustration, assume received video data has a bit depth of eight (e.g., each sample of the video data includes eight bits of data). In this example, IBDI module 41A may perform right shift operations to increase the bit depth of samples to 10 (e.g., such that each sample of the video data includes ten bits of data). In another example, IBDI module 41A may perform right shift operations to increase the bit depth of samples to 12. Other variations are also possible.

In the example shown in FIG. 3, IBDI module 41A is positioned at the relative input of video encoder 20, such that all operations of video encoder 20 are bit depth increased. However, it should be understood that, in some examples, IBDI may be applied to only a sub-set of operations associated with video encoder 20. For example, IBDI module 41A may perform IBDI for all or any sub-set of operations within video encoder 20 (e.g., operations associated with motion estimation unit 42, motion compensation unit 44, intra prediction unit 46, transform unit 52, quantization unit 54, inverse quantization unit 58, inverse transform unit 60, deblocking or other filters (not shown), or any other unit of video encoder 20).

Motion estimation unit 42 and motion compensation unit 44 perform inter-predictive coding of the received video block relative to one or more blocks in one or more reference pictures. That is, motion estimation unit 42 may perform inter-predictive coding of the received video block relative to one or more blocks in one or more reference pictures of a different temporal instance, e.g., motion estimation using one or more reference pictures of the same view. In addition, motion estimation unit 42 may perform inter-predictive coding of the received video block relative to one or more blocks in one or more reference pictures of the same temporal instance, e.g., motion disparity using one or more reference pictures of a different view.

Intra prediction unit 46 may perform intra-predictive coding of the received video block relative to one or more neighboring blocks in the same picture or slice as the block to be coded to provide spatial compression. Mode select unit 40 may select one of the coding modes, intra or inter, e.g., based on error results, and provides the resulting intra- or inter-coded block to summer 50 to generate residual block data and to summer 62 to reconstruct the encoded block for use in a reference picture.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector (or displacement vector) determined by motion estimation unit 42. Again, motion estimation unit 42 and motion compensation unit 44 may be functionally integrated, in some examples.

Motion estimation unit 42 may calculate a motion vector for a video block of an inter-coded picture by comparing the video block to video blocks of a reference picture in reference picture memory 64. Motion compensation unit 44 may also interpolate sub-integer pixels of the reference picture, e.g., an I-frame or a P-frame. The ITU-T H.264 standard refers to "lists" of reference pictures, e.g., list 0 and list 1. List 0 includes reference pictures having a display order earlier than the current picture, while list 1 includes reference pictures having a display order later than the current picture. In other coding schemes, a single list may be maintained.

Motion estimation unit 42 compares blocks of one or more reference pictures from reference picture memory 64 to a block to be encoded of a current picture, e.g., a P-picture or a B-picture. When the reference pictures in reference picture memory 64 include values for sub-integer pixels, a motion vector calculated by motion estimation unit 42 may refer to a sample corresponding to sub-integer pixel location of a reference picture. Motion estimation unit 42 sends the calculated motion vector to entropy coding unit 56 and motion compensation unit 44. The reference picture block identified by a motion vector may be referred to as a predictive block. Motion compensation unit 44 calculates residual error values for the predictive block of the reference picture.

Transform unit 52 applies a transform, such as a discrete cosine transform (DCT), integer transform, or a conceptually similar transform, to the residual block, producing a video block comprising residual transform coefficient values. Transform unit 52 may perform other transforms, such as those defined by the H.264 standard, which are conceptually similar to DCT. Wavelet transforms, integer transforms, sub-band transforms or other types of transforms could also be used. In any case, transform unit 52 applies the transform to the residual block, producing a block of residual transform coefficients. Transform unit 52 may convert the residual information from a pixel value domain to a transform domain, such as a frequency domain.

Quantization unit 54 quantizes the residual transform coefficients to further reduce bit rate. The quantization process may reduce the bit depth associated with some or all of the coefficients. The degree of quantization may be modified by adjusting a quantization parameter. For example, quantization generally involves mapping values within a relatively large range to values in a relatively small range, thus reducing the amount of data needed to represent the quantized transform coefficients. The video encoder may quantize the transform coefficients by applying a quantization parameter (QP) according to a predefined algorithm. The video encoder may modify the degree of quantization applied to the transform coefficient values by adjusting the QP.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding (CABAC), context may be based on neighboring macroblocks.

In some cases, entropy coding unit 56 or another unit of video encoder 20 may be configured to perform other coding functions, in addition to entropy coding. For example, entropy coding unit 56 may be configured to determine the CBP values for the macroblocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

Prior to entropy coding, IBDI module 41B may round sample values from an increased bit depth (e.g., as increased by IBDI module 41A) to an original bit depth. That is, after performing internal operations using the increased bit depth, IBDI module 41B may return the video data to the original bit depth (i.e., the bit depth at which the data was received by video encoder 20, or some other relatively lower bit depth prior to the video data being output from video encoder 20.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

In some examples, according to aspects of this disclosure, IBDI module 41C may help to manage memory utilization when using IBDI. For example, prior to storing reconstructed blocks to reference picture memory 64, IBDI module 41C may determine whether the data will actually be used as reference data. According to aspects of this disclosure, IBDI module 41C may not alter video data that will be used as reference data. Rather, reconstructed pictures may be stored to reference picture memory 64 at the IBDI (increased) bit depth. In contrast, IBDI module 41C may round samples of pictures that will not be used as reference pictures. That is, IBDI module 41C may decrease the bit depth of decoded pictures prior to storing the decoded pictures to reference picture memory 64. In this way, video encoder 20 may achieve certain memory consumption savings when using IBDI, as at least some of the data stored in reference picture memory 64 may be stored at reduced bit depth.

In addition, according to some aspects of this disclosure, video encoder 20 may provide certain indications regarding an output format for a video decoder, such as video decoder 30 described below. For example, video encoder 20 may encode syntax elements indicating whether a video decoder should output decoded pictures at the bit depth at which the video data was received, or output the decoded pictures at an increased bit depth (e.g., an IBDI bit depth). Such signaling may be provided, for example, in an SPS, PPS, or other parameter set, or in an SEI message. In another example, such signaling may be provided in a file format (e.g., as an extension to an ISO base media file format), signaling in a sample that contains profile and level information. In another example, in an MPEG-2 system, such signaling may be provided in a descriptor. In another example, in a Dynamic Adaptive Streaming over HTTP (DASH) environment, such signaling may be provided in a media presentation description (MPD) file.

While IBDI modules 41 are shown as separate modules, with module 41A responsible for increasing the bit depth, module 41B responsible for truncating the bit depth prior to output, and module 41C responsible for truncating the bit depth prior to storage in reference picture memory 63, it should be understood that such IBDI modules 41 may be highly integrated and/or incorporated into a single module. In addition, while shown as discrete modules for purposes of explanation, it should be understood that IBDI modules 41 may be implemented in hardware, software, firmware, or any combination thereof.

Figure 4:
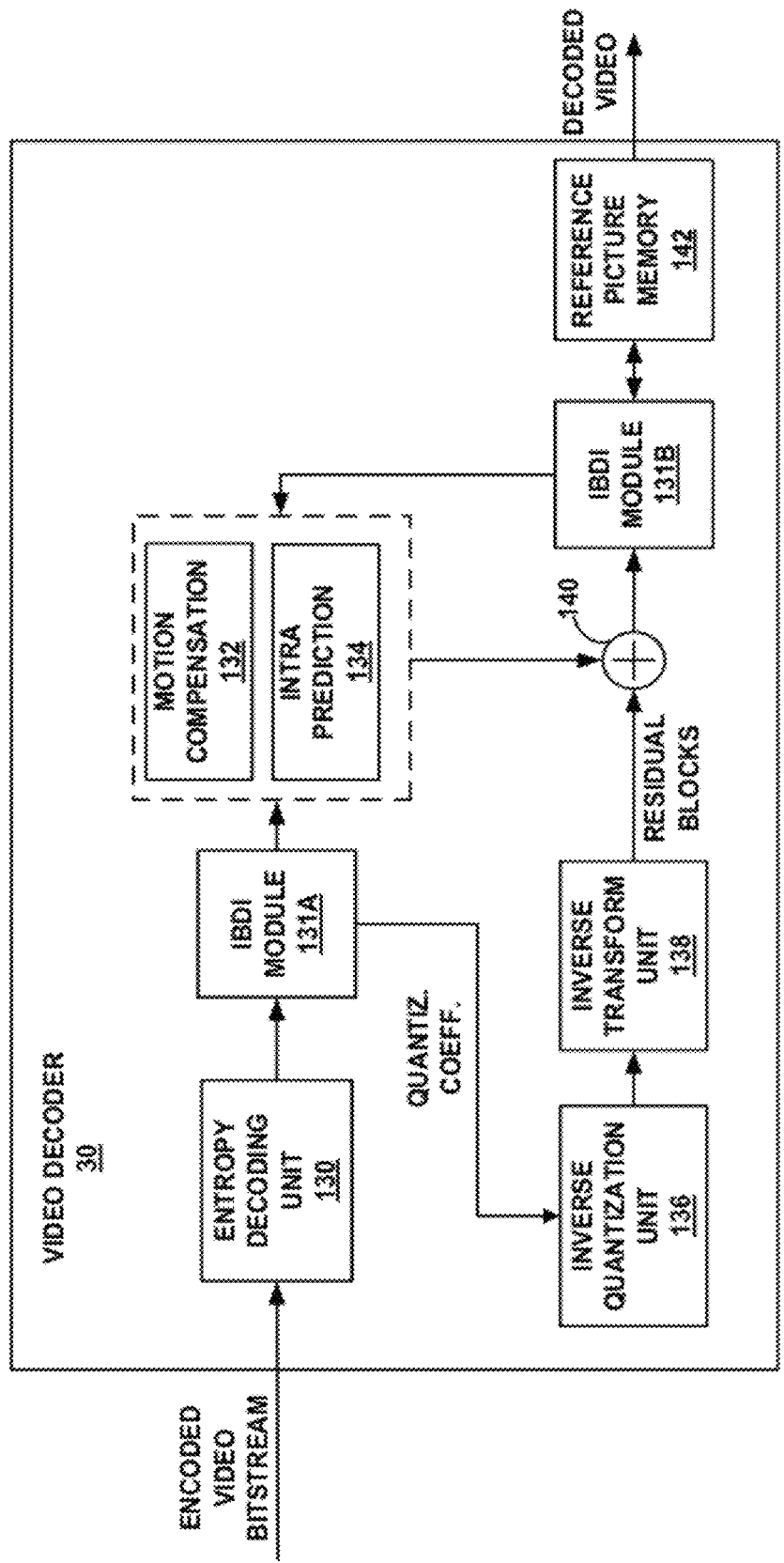
FIG. 4 is a block diagram illustrating an example of a video decoder that may implement any or all of the techniques of this disclosure.

FIG. 4 is a block diagram illustrating an example of video decoder 30 that may perform the techniques of this disclosure. In the example of FIG. 4, video decoder 30 includes an entropy decoding unit 130, IBDI module 131A and 131B (collectively, IBDI modules 131), motion compensation unit 132, intra prediction unit 134, inverse quantization unit 136, inverse transformation unit 138, reference picture memory 142 and summer 140.

Entropy decoding unit 130 may entropy decode a received bitstream. For example, entropy decoding unit 130 may receive serialized transform coefficients and inverse scan the transform coefficients to generate a two-dimensional array of transform coefficients.

IBDI module 131A may increase the bit depth of the entropy decoded samples. For example, as described with respect to FIGS. 2 and 3 above, IBDI module 131A may perform a right shift operation to increase the bit depth of received samples. In an example for purposes of illustration, assume received video data (e.g., transform coefficients, motion vectors, and the like from an encoded bitstream) has a bit depth of eight (e.g., each sample of the video data includes eight bits of data). In this example, IBDI module 131A may perform right shift operations to increase the bit depth of samples to 10. In another example, IBDI module 131A may perform right shift operations to increase the bit depth of samples to 12. Other variations are also possible.

Motion compensation unit 132 may generate prediction data based on motion vectors received from entropy decoding unit 130. Motion compensation unit 132 may use motion vectors received in the bitstream to identify a prediction block in reference pictures in reference picture memory 142. Intra prediction unit 134 may use intra prediction modes received in the bitstream to form a prediction block from spatially adjacent blocks. Inverse quantization unit 136 inverse quantizes, i.e., de-quantizes, the quantized block coefficients provided in the bitstream and decoded by entropy decoding unit 130.

Inverse transform unit 158 applies an inverse transform, e.g., an inverse DCT, an inverse integer transform, or a conceptually similar inverse transform process, to the transform coefficients in order to produce residual blocks in the pixel domain. Motion compensation unit 132 produces motion compensated blocks, possibly performing interpolation based on interpolation filters. Identifiers for interpolation filters to be used for motion estimation with sub-pixel precision may be included in the syntax elements. Motion compensation unit 132 may use interpolation filters as used by video encoder 20 during encoding of the video block to calculate interpolated values for sub-integer pixels of a reference block. Motion compensation unit 132 may determine the interpolation filters used by video encoder 20 according to received syntax information and use the interpolation filters to produce predictive blocks.

Motion compensation unit 132 uses some of the syntax information to determine sizes of macroblocks used to encode picture(s) of the encoded video sequence, partition information that describes how each macroblock of a picture of the encoded video sequence is partitioned, modes indicating how each partition is encoded, one or more reference pictures (or lists) for each inter-encoded macroblock or partition, and other information to decode the encoded video sequence.

Summer 140 sums the residual blocks with the corresponding prediction blocks generated by motion compensation unit 132 or intra-prediction unit to form decoded blocks. If desired, a deblocking filter may also be applied to filter the decoded blocks in order to remove blockiness artifacts. The decoded video blocks are then stored in reference picture memory 142, which provides reference blocks for subsequent motion compensation and also produces decoded video for presentation on a display device (such as display device 32 of FIG. 1).

According to aspects of this disclosure, IBDI module 131B may help to manage memory utilization when using IBDI. For example, prior to storing decoded pictures to reference picture memory 142, video decoder 30 may determine whether the pictures will be used as reference pictures, e.g., for decoding other predicted pixel values. According to aspects of this disclosure, IBDI module 131B may not alter pictures that will be used as reference pictures. Rather, video decoder 30 may store decoded pictures to reference picture memory 142 at the IBDI (increased) bit depth. That is, with respect to the IBDI example shown and described in FIG. 2 above, video decoder 30 may store decoded pictures to reference picture memory 142 with an "N" bit depth.

In contrast, IBDI module 131B may round samples of decoded pictures that will not be used as reference pictures. For example, certain pictures (e.g., such as some B-frames and the like) may not be used as reference pictures. Moreover, in some instances, video decoder 30 may mark certain pictures as "unused for reference." For example, a picture may be marked as unused for reference if the picture has been decoded but has not yet been displayed and is not used as a reference picture. Accordingly, when a picture will not be used as reference data, IBDI module 131B may decrease the bit depth of the decoded picture prior to storing the decoded picture to reference picture memory 142. That is, IBDI module 131B may convert any decoded pictures not used as reference pictures from the increased bit depth to the original, lower bit depth. For example, IBDI module 131B may initially store decoded pictures not used reference pictures to reference picture memory 142 in the lower bit depth. IBDI module may also convert decoded pictures that were originally stored at the increased bit depth but are no longer used as reference pictures to the lower bit depth. In this way, video decoder 30 may achieve certain memory consumption savings when using IBDI, as at least some of the data stored in reference picture memory 142 may be stored at a lower bit depth, relative to the increased bit depth.

According to some aspects of this disclosure, video decoder 30 may maintain pictures at the original bit depth (e.g., non-IBDI bit depth), regardless of whether the picture is used as a reference picture. According to this modified IBDI process, video decoder 30 may increase the bit depth when a picture is used for certain processes, such as motion compensation. That is, for example, video decoder 30 may perform relatively higher precision calculations in internal decoding processes such as sub-pixel interpolation, inverse quantization, inverse transformation, and final reconstruction. IBDI module 131B, however, may then decrease the bit depth of all decoded pictures (including pictures used as reference pictures) prior to storing the decoded pictures to reference picture memory 142 to reduce memory bandwidth consumption.

In some instances, video decoder 30 may output decoded pictures at an increased bit depth, relative to the bit depth at which data was received (e.g., the received encoded bitstream). Outputting the increased bit depth data may provide relatively better video and/or audio quality for decoders and displays that are able to handle such higher bit depth data.

According to aspects of this disclosure, video decoder 30 may determine whether to output decoded pictures at an increased bit depth (e.g., an IBDI bit depth) or an original bit depth (e.g., a bit depth at which the encoded bitstream was received) based on a received output bit depth indicator. For example, video decoder 30 may receive and decode certain syntax elements indicating an output bit depth and output the decoded pictures (e.g., from reference picture memory 142) in accordance with the decoded syntax element.

In an example, an output bit depth indicator may be included in an SPS, PPS or other parameter set, SEI message, and/or other message. For example, video decoder 30 may receive a flag (e.g., display_IBDI_depth_flag) in an SPS or SEI message that indicates whether to output decoded pictures in an original bit depth (e.g., a bit depth at which the coded video data was received or an increased bit depth (e.g., an IBDI bit depth)). If the display bit depth flag is set to zero ("0"), video decoder 30 may output decoded pictures at the original bit depth, while if the display flag is set to one ("1"), video decoder 30 may output decoded pictures at the increased bit depth (or vice versa). In some examples, the display bit depth flag may only be set when an IBDI process is enabled (e.g., a bitDepthIncreased syntax element is larger than zero, indicating IBDI is enabled).

According to aspects of this disclosure, video decoder 30 may implement a lightweight transcoding technique to modify the display bit depth flag based on a variety of factors. For example, if a display (such as display device 32 shown in FIG. 1) is only capable of displaying pictures having the original bit depth (e.g., an 8-bit depth), video decoder 30 may reset the display bit depth flag to zero, regardless of the original value of the display bit depth flag. That is, video decoder 30 may reset the display bit depth flag from a value of one to a value of zero if the display is not capable of presenting the decoded pictures at the increased bit depth.

In other examples, rather than a flag being included in a parameter set or other message, a flag may be a configurable parameter associated with a particular coding standard. For example, with respect to the emerging HEVC standard, a displayIBDIDepthFlag parameter may be used in the decoding process. In this example, the parameter may be signaled in the system specifications, regardless of whether a display bit depth flag is included in a parameter set (e.g., an SPS or PPS) or other message (e.g., an SEI message).

In other examples, an output bit depth indicator may be included in a file format (e.g., as an extension to an ISO base media file format). For example, the output bit depth indicator may be included in a sample that contains profile and level information. In an example for purposes of illustration, the output bit depth indicator may share the same AVCDecoderConfigurationRecord as the AVC file format discussed above with respect to FIG. 1. However, according to aspects of this disclosure, the file format may be modified according to the following format:

```
aligned(8) class AVCDecoderConfigurationRecord {
    unsigned int(8) configurationVersion = 1;
    unsigned int(8) AVCProfileIndication;
    unsigned int(8) profile_compatibility;
    unsigned int(8) AVCLevelIndication;
    bit        (1) displayIBDIDepth;
    if (displayIBDIDepth) {
        unsigned int (3) IBDI_bit_depth_luma_minus8;
    }
    else bit reserved = '111'b;
    bit(2) reserved = '11'b;
    unsigned int(2) lengthSizeMinusOne;
    bit(3) reserved = '111'b;
    unsigned int(5) numOfSequenceParameterSets;
    for (i=0; i< numOfSequenceParameterSets; i++) {
        unsigned int(16) sequenceParameterSetLength;
        bit(8*sequenceParameterSetLength)
sequenceParameterSetNALUnit;
    }
    unsigned int(8) numOfPictureParameterSets;
    for (i=0; i< numOfPictureParameterSets; i++) {
        unsigned int(16) pictureParameterSetLength;
        bit(8*pictureParameterSetLength)
pictureParameterSetNALUnit;
    }
}
```

In this example, a displayIBDIDepth that is equal to zero ("0") indicates that either IBDI is not used in the bitstream, or the output signal (e.g., the decoded pictures from video decoder 30) uses the lower, non IBDI bit-depth (e.g., M-bit). Alternatively, a displayIBDIDepth that is equal to one ("1") may indicate that IBDI is used and the output signal is to be displayed with an increased bit-depth. According to some aspects of this disclosure, when a display bit depth flag (e.g., display_IBDI_depth_flag) is present in an SPS (or, in some examples, SEI message), displayIBDIDepth is set equal to display_IBDI_depth_flag. In the example shown above, IBDI_bit_depth_luma_minus8 plus 8 may indicate the bit-depth (N) that is to be used for display. That is, IBDI_bit_depth_luma_minus8+8 is equal to (N), which may be equal to the bit depth (M) combined with bitDepthIncreased.

It should be understood that the example above is provided for purposes of illustration only, and that other examples are also possible. For example, the AVCDecoderConfigurationRecord described above may be renamed to HEVCDecoderConfigurationRecord, but may play the same role in the emerging HEVC file format as the AVCDecoderConfigurationRecord in the AVC file format.

In another example, an output bit depth indicator may be included in a descriptor, such as an MPEG-2 descriptor. For example, an HEVC MPEG-2 Systems design might be similar to that of AVC, as described above. That is, HEVC MPEG-2 may reuse the AVC video descriptor to describe the HEVC bitstream, with the changes illustrated in Table 2 below:

TABLE 2

AVC Video Descriptor

| Syntax | No. of bits | Mnemonic |
|---|---|---|
| AVC_video_descriptor ( ) { | | |
|     descriptor_tag | 8 | uimsbf |
|     descriptor_length | 8 | uimsbf |
|     profile_idc | 8 | uimsbf |
|     constraint_set0_flag | 1 | bslbf |
|     constraint_set1_flag | 1 | bslbf |
|     constraint_set2_flag | 1 | bslbf |
|     AVC_compatible_flags | 5 | bslbf |
|     level_idc | 8 | uimsbf |
|     display_IBDI_depth | 1 | bslbf |
|     IBDI_depth_minus8 | 3 | uimsbf |
|     AVC_still_present | 1 | bslbf |
|     AVC_24_hour_picture_flag | 1 | bslbf |
|     reserved | 3 | bslbf |
| } | | |

In the example of Table 2, display_IBDI_depth equal to zero ("0") may indicate that either IBDI is not used in the bitstream or the output signal to be displayed (e.g., the decoded pictures from video decoder 30) uses the lower, non IBDI bit-depth (e.g., M-bit). Alternatively, display_IBDI_depth that is equal to one ("1") may indicate that IBDI is used and the output signal is to be displayed with an increased bit-depth (e.g., N-bit, where N is greater than M). When display_IBDI_depth_flag is present in an SPS, display_IBDI_depth may be set equal to display_IBDI_depth_flag. In addition, in the example shown above, IBDI_bit_depth_minus8 plus 8 may indicate the bit-depth (N) that is to be used for display. That is, IBDI_bit_depth_minus8+8 is equal to (N), which may be equal to the bit depth (M) combined with bitDepthIncreased. It should be understood that the example shown in Table 2 is provided for purposes of illustration only. That is, in another example, the descriptor may also be named HEVC descriptor (or a descriptor corresponding to another coding standard) having similar syntax elements.

In still another example, an output bit depth indicator may be included in an MPD file (e.g., in a DASH environment). For example, as noted above, an MPD may describe the different representations of video data that are available to be decoded. For example, an MPD may include data that generally describes characteristics of included representations, such as coding and rendering characteristics, adaptation sets, a profile to which the MPD corresponds, and a variety of other information, as noted above.

According to aspects of this disclosure, an output bit depth may be determined by a server responsible for providing the content at the time of encapsulation (e.g., packaging for transmission to video decoder 30). That is, for example, a service provider may determine that additional bit depth is not required for display of certain content. In such instances, the service provider may set an IBDI flag (e.g., in an MPD) indicating that a representation is not to be displayed at the IBDI bit-depth. Alternatively, the service provider may determine that additional bit depth may be used to display data of a particular representation and may set the display bit-depth indicator accordingly. An example MPD is shown in Table 3 below:

TABLE 3

MPD

| Element or Attribute Name | Use | Description |
|---|---|---|
| Group, Representation, SubRepresentation | | Element |
| @width | O | Specifies the horizontal visual presentation size of the video media type in an alternative Representation on a square grid determined by the @parx and @pary attributes. |
| @height | O | Specifies the vertical visual presentation size of the video media type in an alternative Representation, on a square grid determined by the @parx and @pary attributes. This value should be equal to the vertical pixel resolution of the video. |
| @parx | O | indicates the horizontal size of the encoded video pixels (samples) (in arbitrary units). The default value is 1. |
| @pary | O | indicates the vertical size of the encoded video pixels (in the same arbitrary units as @parx). The default value is 1. |
| @frameRate | O | Specifies the output frame rate or the output field rate of the video media type in the representation for progressive or interlaced video, respectively. If the frame or field rate is varying, the value is the average frame or field rate over the entire duration of the representation. In case of a multiview complementary Representation, the value indicates the frame or field rate of a single view. |

TABLE 3-continued

| | MPD | |
|---|---|---|
| Element or Attribute Name | Use | Description |
| @IBDIDepth | O | This elements when present, indicates that the HEVC representation is to be displayed with a higher bit-depth of IBDIDepth (N-bit). When it is not signalled, the representation is to be displayed with a normal bit-depth (M-bit). This value is equal to the M+ bitDepthIncreased, as indicated in the SPS of HEVC bitstream. |
| @lang | O | Declares the language code(s) for this Representation according to IETF RFC 5646.<br>Note, multiple language codes may be declared as a white-space separated list and indicate that the representation may suit a preference for any of the indicated languages. For a full indication of what media is offered under each language, the Initialisation Segment or a Media Segment may have to be accessed. |
| @numberOfChannels | O | A single value describing the number of audio output channels or a list of available audio channels. For example, @numberOfChannels="5.1 2" for an MPEG Surround Representation |
| @samplingRate | O | A single value describing the sample rate of the audio stream or a list of sample rates available in the audio stream, e.g. @samplingRate="44100 22050" for an HE-AAC stream with the SBR tool enabled and backwards compatible signaling. |
| @mimeType | M | Gives the MIME type of the Initialisation Segment, if present; if the Initialisation Segment is not present it provides the MIME type of the first Media Segment. Where applicable, this MIME type shall include the codec parameters for all media types. The codec parameters shall also include the profile and level information where applicable. |
| @group | O | Specifies the group. |
| @maximumRAPPeriod | O | Provides the maximum time interval between RAPs in seconds in this Representation. If not present, it is unspecified. The index and the presentation time of any RAP shall either be documented by the Segment Index or is implicitly defined by the @startWithRAP attribute set to 'true'. |
| @startWithRAP | O | When 'true', indicates that all Segments in the Representation start with a RAP (both in terms of data and in terms of presentation time). The presentation time of the RAP shall either be provided explicitly by the Segment Index or, if the @segmentAlignmentFlag is true, may be inferred from the presentation time of the last sample of the previous segment. |
| ContentProtection | 0 . . . N | Provides information about the use of content protection for this Representation or Group of Representation.<br>When not present the content is neither encrypted nor DRM protected.<br>When multiple elements are present, then the successful processing of one of the elements is sufficient to access the described Representations. |

TABLE 3-continued

MPD

| Element or Attribute Name | Use | Description |
| --- | --- | --- |
| Accessibility | 0 . . . N | Provides information about Accessibility Information scheme |
| Rating | 0 . . . N | Provides information Content rating scheme |
| Viewpoint | 0 . . . N | Provides information Content View Point annotation scheme |
| MultipleViews | 0 . . . 1 | Provides information for video that contains multiple views |

Legend:
For attributes: M = Mandatory, O = Optional, OD = Optional with Default Value, CM = Conditionally Mandatory.
For elements: <minOccurs> . . . <maxOccurs>(N = unbounded)
Elements are bold; attributes are non-bold and preceded with an @.

As noted above, when @IBDIDepth element is present, the element may be used to indicate that the HEVC representation (or representation of another coding standard) is to be displayed with an increased bit-depth of IBDIDepth (N-bit). When the element is not present, the representation is to be displayed with a normal bit-depth (M-bit). The value of @IBDIDepth may be equal to the M bit-depth+bit-DepthIncreased, as indicated in the SPS (or SEI message) of the bitstream.

In some examples, as noted above, a modified IBDI process may be used that includes rounding of all decoded pictures being stored to reference picture memory 142, regardless of whether the decoded pictures are used as reference pictures. In such examples, an additional indicator (e.g., flag) may be implemented to indicate whether to use a first IBDI process or a second, modified IBDI process. Such an indicator may be provided in an SPS, SEI message, and the like, as described above. For example, if the indicator is true, a modified IBDI process may be used for a sequence of pictures. Alternatively, if the indicator is false, a current IBDI process may be used for the sequence of pictures.

While the output bit depth indicators described above are generally described with respect to video decoder 30, it should be understood that such indicators may be generated and/or transmitted by one or more devices. For example, the display bit depth indicators described above may be generated by a variety of video coders, including video encoder 20 (FIGS. 1 and 2), a server or other component for providing content (as described with respect to the DASH example above) other processors, processing units, hardware-based coding units such as encoder/decoders (CODECs), and the like.

According to aspects of this disclosure, video decoder 30 may receive the output bit depth indicator and determine whether to output decoded pictures at an increased bit depth or an original bit depth based on a received output bit depth indicator. In examples in which video decoder 30 outputs decoded pictures in an increased bit depth, IBDI module 131B may not alter the decoded pictures prior to storing the decoded pictures in reference picture memory 142. That is, as noted above, when IBDI is implemented, IBDI module 131A may increase the bit depth of video data prior to performing certain internal coding operations. When video decoder 30 outputs decoded pictures in an increased bit depth, IBDI module 131B may not round the bit depth of the video data prior to storing the decoded pictures to reference picture memory 142. Accordingly, video decoder 30 may output decoded pictures from reference picture memory 142 (e.g., for presentation at a display, such as display device 32 (FIG. 1)) in the increased bit depth.

Alternatively, in examples in which video decoder 30 outputs decoded pictures in a non-IBDI bit-depth, IBDI module 131B may implement the techniques described in this disclosure when storing decoded pictures to reference picture memory 142. That is, in some examples, IBDI module 131B may not alter samples of pictures that will be used as reference pictures. Rather, video decoder 30 may store decoded pictures to reference picture memory 142 at the IBDI (increased) bit depth. In contrast, according to aspects of this disclosure, IBDI module 131B may round samples of pictures that will not be used as reference pictures.

While IBDI modules 131 are shown as separate modules, it should be understood that such IBDI modules 131 may be highly integrated and/or incorporated into a single module. In addition, while shown as discrete modules for purposes of explanation, it should be understood that IBDI modules 131 may be implemented in hardware, software, firmware, or any combination thereof.

Figure 5:
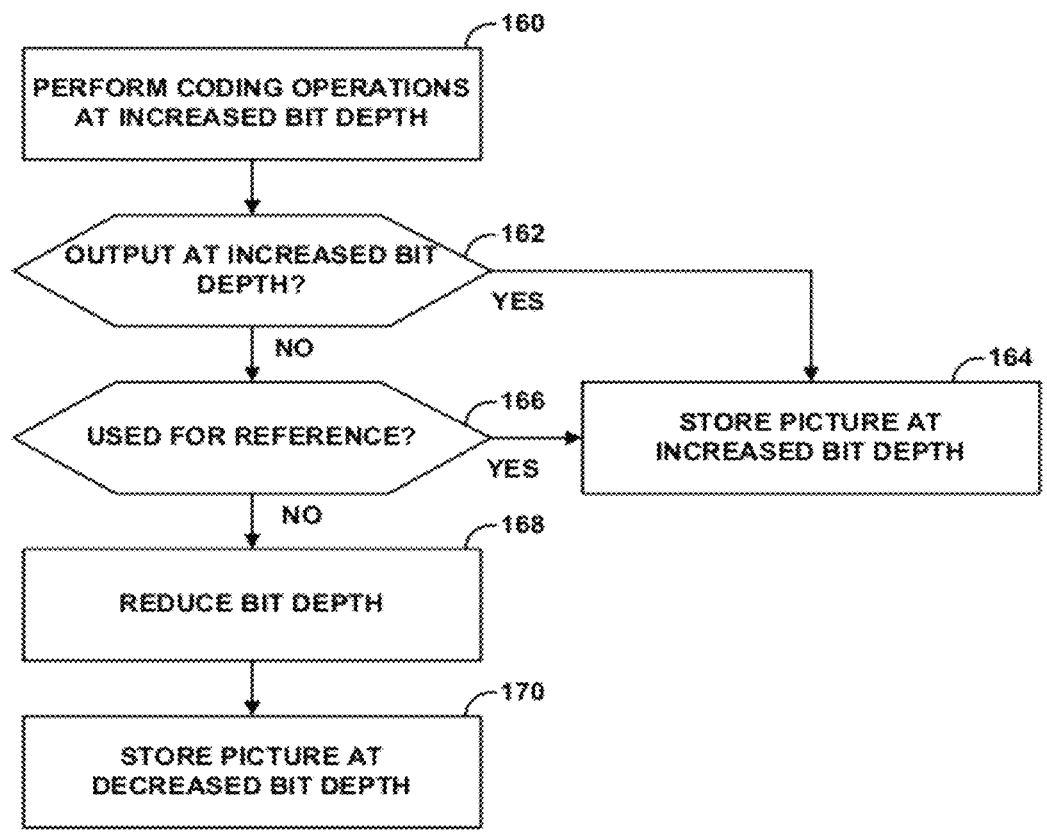
FIG. 5 is a flow chart illustrating an example method of performing IBDI related operations in video coding.

FIG. 5 is a block diagram illustrating increasing a bit depth when performing operations associated with video coding. The example shown in FIG. 5 is generally described as being performed by a video coder. It should be understood that, in some examples, the technique of FIG. 5 may be carried out by video encoder 20 (FIGS. 1 and 2) or video decoder 30 (FIGS. 1 and 3), described above. In other examples, the technique of FIG. 5 may be performed by a variety of other processors, processing units, hardware-based coding units such as encoder/decoders (CODECs), and the like.

In the example shown in FIG. 5, the video coder may use an IBDI process, such as those described above, to perform one or more video coding operations on video data at an increased bit depth (160). For example, the video coder may receive one or more samples of video data having a bit depth of eight and may increase the bit depth from 8 to 10, 12, or another, higher bit depth. The video coder may perform operations on the video data using the increased bit depth such as performing intra-frame prediction, applying one or more interpolation filters (including sub-pixel interpolation), applying one or more de-blocking filters, applying one or more spatial transforms (or inverse transforms), performing quantization, or performing other processes.

The video coder may also determine whether to output video data, i.e., decoded pictures, at an increased bit depth (162). According to aspects of this disclosure, the video coder may make such a determination based on, for example, a received output bit depth indicator. As described above, the indicator may include an output display bit depth flag contained in an SPS, an SEI message, or the like. In other examples, the indicator may be provided in a file format (e.g., as an extension to an ISO base media file format), one or more syntax elements that are provided in a sample that contains profile and level information, a descriptor (e.g., an MPEG-2 descriptor), or an MPD file (e.g., in a DASH environment. In still other examples, a device external to the video coder, such as a display device (e.g., display device 32 shown in FIG. 1) may determine the output bit depth though, for example, remote control.

In the example shown in FIG. 5, if the video coder is to output video data at the increased bit depth (e.g., the YES branch of step 162), the video coder may store the video data (e.g., to a decoded picture buffer) at the increased bit depth (164). If the video coder is not to output the video data at the increased bit depth (e.g., the NO branch of step 162), the video coder may determine whether the video data is used as reference data (166). According to aspects of this disclosure, if the video data is used as reference data (e.g., the YES branch of 166), the video coder may store the video data at the increased bit depth (164).

If the video data is not used as reference data (e.g., the NO branch of 166), the video coder may reduce the bit depth of the video data (168). For example, certain pictures (e.g., such as some B-frames and the like) may not be used as reference pictures. Moreover, in some instances, the video coder may mark certain video data as "unused for reference." In such examples, the video coder may reduce the bit depth from the increased bit depth used for IBID operations to an original bit depth. The video coder may then store the video data at the decreased bit depth (170).

The example shown in FIG. 5 may reduce memory requirements associated with encoding and/or decoding video data. For example, the techniques shown in the example of FIG. 5 may allow fewer bits of data to be stored, which may reduce memory requirements as well as memory bandwidth consumption.

It should be understood that the steps shown in FIG. 5 are provided as merely one example. That is, according to some aspects of this disclosure, the video coder may maintain video data at the original bit depth (e.g., non-IBDI bit depth), regardless of whether the video data is used for reference. According to this modified IBDI process, the video coder may increase the bit depth when video data is used for certain processes (e.g., internal coding processes associated with motion compensation, sub-pixel interpolation, quantization, transformation, and reconstruction), but may then decrease the bit depth of all decoded video data prior to storing the video data to reduce memory bandwidth consumption.

In addition, the steps of the method of FIG. 5 need not necessarily be performed in the order shown in FIG. 5, and fewer, additional, or alternative steps may be performed. For example, the aspects of this disclosure directed to memory utilization management (e.g., steps 166-168) may be performed independently of the aspects of this disclosure directed to determining an output bit depth (e.g., step 162), as described above.

Moreover, it should also be understood that, depending on the example, certain acts or events of any of the techniques described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method of coding video data comprising:
    coding video data using a first bit depth;
    determining whether to output the video data at the first bit depth or a second bit depth that is less than the first bit depth;
    determining whether the video data will be used as reference data when coding other video data; and
    prior to storing the video data, in response to determining that the video data is to be output at the second bit depth and that the video data is not used as reference data, reducing the video data from the first bit depth to the second bit depth;
    storing the video data at the second bit depth.

2. The method of claim 1 wherein reducing the video data from the first bit depth to the second bit depth comprises performing a bit shift operation on the video data to convert the first bit depth to the second bit depth.

3. The method of claim 1, wherein the video data comprises a decoded picture and wherein storing the video data comprises storing the decoded picture to a decoded picture buffer.

4. The method of claim 1, further comprising, prior to coding the video data using the first bit depth, receiving the video data at the second bit depth and increasing the second bit depth to the first bit depth, wherein coding the video data using the first bit depth comprises coding the video data using an internal bit depth increase (IBDI) process.

5. The method of claim 1, wherein coding the video data comprises performing a high accuracy internal process (HAIP) on the video data.

6. The method of claim 1, wherein the second bit depth is eight bits and the first bit depth is equal to or greater than ten bits.

7. The method of claim 1, further comprising encoding an indication of whether to display the video data in one of the first bit depth and the second bit depth.

8. The method of claim 7, wherein encoding the indication comprises including the indication in one of a sequence parameter set (SPS) and a supplemental enhancement information (SEI) message in an encoded bitstream of video data.

9. The method of claim 1, further comprising coding an indication in one of a file format and a descriptor whether an output bit depth is equal to the second bit depth.

10. The method of claim 9, wherein the indication comprises an indication of an output bit depth.

11. The method of claim 9, wherein the file format comprises one of an ISO base media file format and a transport stream format.

12. The method of claim 9, wherein the descriptor comprises a Dynamic Adaptive Streaming based on HTTP (DASH) Media Presentation Description (MPD) descriptor.

13. The method of claim 9, wherein coding the indication comprises decoding the file format containing the indication and determining whether to display the video data in one of the first bit depth and the second bit depth.

14. The method of claim 9, wherein coding the indication comprises decoding the descriptor containing the indication and determining whether to display the video data in one of the first bit depth and the second bit depth.

15. The method of claim 9, wherein coding the indication comprises decoding a Media Presentation Description (MPD) containing the indication and determining whether to display the video data in one of the first bit depth and the second bit depth.

16. The method of claim 1, further comprising determining whether an output bit depth comprises the first bit depth or the second bit depth based on a configuration of a display device.

17. The method of claim 1, the method being executable on a wireless communication device, wherein the device comprises:
    a memory configured to store the video data;
    a processor configured to execute instructions to process the video data stored by the memory; and
    a receiver configured to receive the video data.

18. The method of claim 17, wherein the wireless communication device is a cellular telephone and the video data is received by the receiver and modulated according to a cellular communication standard.

19. An apparatus for coding video data comprising:
    a memory configured to store video data; and
    one or more processors configured to:
        code the video data using a first bit depth;
        determine whether to output the video data at the first bit depth or a second bit depth that is less than the first bit depth;
        determine whether the video data will be used as reference data when coding other video data;
        prior to storing the video data, in response to determining that the video data is to be output at the second bit depth and that the video data is not used as reference data, reduce the video data from the first bit depth to the second bit depth; and
        store the video data at the second bit depth.

20. The apparatus of claim 19 wherein, to reduce the video data from the first bit depth to the second bit depth, the one or more processors are configured to perform a bit shift operation on the video data to convert the first bit depth to the second bit depth.

21. The apparatus of claim 19, wherein the video data comprises a decoded picture and wherein, to store the video data, the one or more processors are configured to store the decoded picture to a decoded picture buffer.

22. The apparatus of claim 19, wherein the one or more processors are further configured to, prior to coding the video data using the first bit depth, receive the video data at the second bit depth and increasing the second bit depth to the first bit depth, wherein to code the video data using the first bit depth, the one or more processors are configured to code the video data using an internal bit depth increase (IBDI) process.

23. The apparatus of claim 19, wherein, to code the video data, the one or more processors are configured to perform a high accuracy internal process (HAIP) on the video data.

24. The apparatus of claim 19, wherein the second bit depth is eight bits and the first bit depth is equal to or greater than ten bits.

25. The apparatus of claim 19, the one or more processors are further configured encode an indication of whether to display the video data in one of the first bit depth and the second bit depth.

26. The apparatus of claim 25, wherein, to encode the indication, the one or more processors are configured to include the indication in one of a sequence parameter set (SPS) and a supplemental enhancement information (SEI) message in an encoded bitstream of video data.

27. The apparatus of claim 19, the one or more processors are further configured to code an indication in one of a file format and a descriptor whether an output bit depth is equal to the second bit depth.

28. The apparatus of claim 27, wherein the indication comprises an indication of an output bit depth.

29. The apparatus of claim 27, wherein the file format comprises one of an ISO base media file format and a transport stream format.

30. The apparatus of claim 27, wherein the descriptor comprises a Dynamic Adaptive Streaming based on HTTP (DASH) Media Presentation Description (MPD) descriptor.

31. The apparatus of claim 27, wherein, to code the indication, the one or more processors are configured to decode the file format containing the indication and determine whether to display the video data in one of the first bit depth and the second bit depth.

32. The apparatus of claim 27, wherein, to code the indication, the one or more processors are configured to decode the descriptor containing the indication and determine whether to display the video data in one of the first bit depth and the second bit depth.

33. The apparatus of claim 27, wherein, to code the indication, the one or more processors are configured to decode a Media Presentation Description (MPD) containing the indication and determine whether to display the video data in one of the first bit depth and the second bit depth.

34. The apparatus of claim 19, the one or more processors are further configured to determine whether an output bit depth comprises the first bit depth or the second bit depth based on a configuration of a display device.

35. The apparatus of claim 19, wherein the apparatus is a wireless communication device, further comprising a receiver configured to receive the video data.

36. The apparatus of claim 35, wherein the wireless communication device is a cellular telephone and the video data is received by the receiver and modulated according to a cellular communication standard.

37. An apparatus for coding video data comprising:
means for coding video data using a first bit depth;
means for determining whether to output the video data at the first bit depth or a second bit depth that is less than the first bit depth;
means for determining whether the video data will be used as reference data when coding other video data;
means for reducing, prior to storing the video data and in response to determining that the video data is to be output at the second bit depth and that the video data is not used as reference data, the video data from the first bit depth to the second bit depth; and
means for storing the video data at the second bit depth.

38. The apparatus of claim 37, wherein means for reducing the video data from the first bit depth to the second bit depth comprises means for performing a bit shift operation on the video data to convert the first bit depth to the second bit depth.

39. The apparatus of claim 37, further comprising means for including, in an encoded bitstream of the video data, an indication of whether to display the video data in one of the first bit depth and the second bit depth.

40. The apparatus of claim 37, further comprising means for coding an indication in one of a file format and a descriptor whether an output bit depth is equal to the second bit depth.

41. A non-transitory computer-readable storage medium having instructions stored thereon that, when executed, cause one or more processors to: code video data using a first bit depth; determine whether to output the video data at the first bit depth or a second bit depth that is less than the first bit depth; determine whether the video data will be used as reference data when coding other video data; prior to storing the video data, in response to determining that the video data is to be output at the second bit depth and that the video data is not used as reference data, reduce the video data from the first bit depth to the second bit depth; and store the video data at the second bit depth.

* * * * *